March 3, 1931.  E. B. ALLEN  1,795,003
MEANS FOR DESTROYING MARINE GROWTHS IMPEDING NAVIGATION
Filed Oct. 4, 1928  3 Sheets-Sheet 1
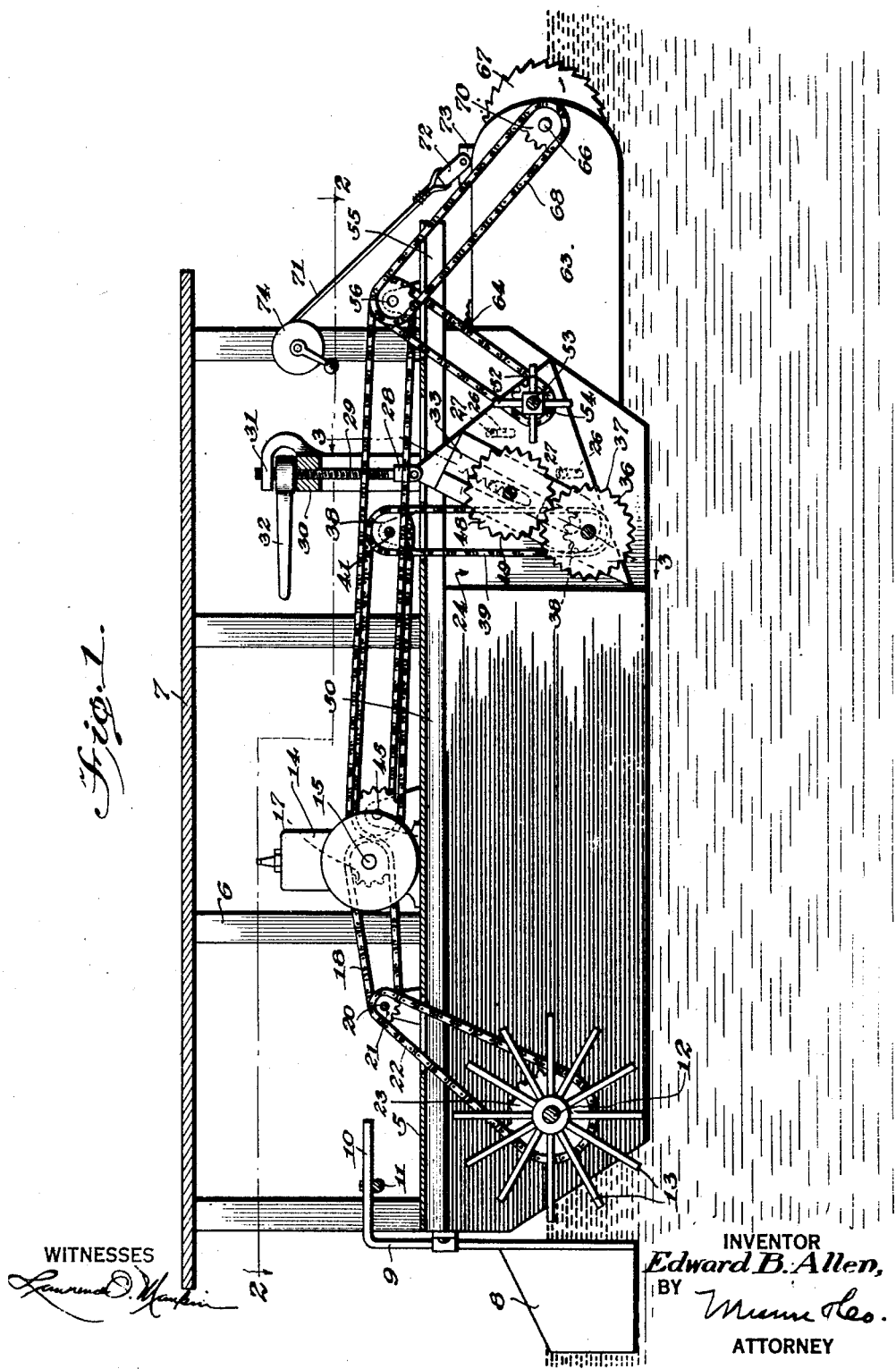
INVENTOR
*Edward B. Allen,*
BY
ATTORNEY

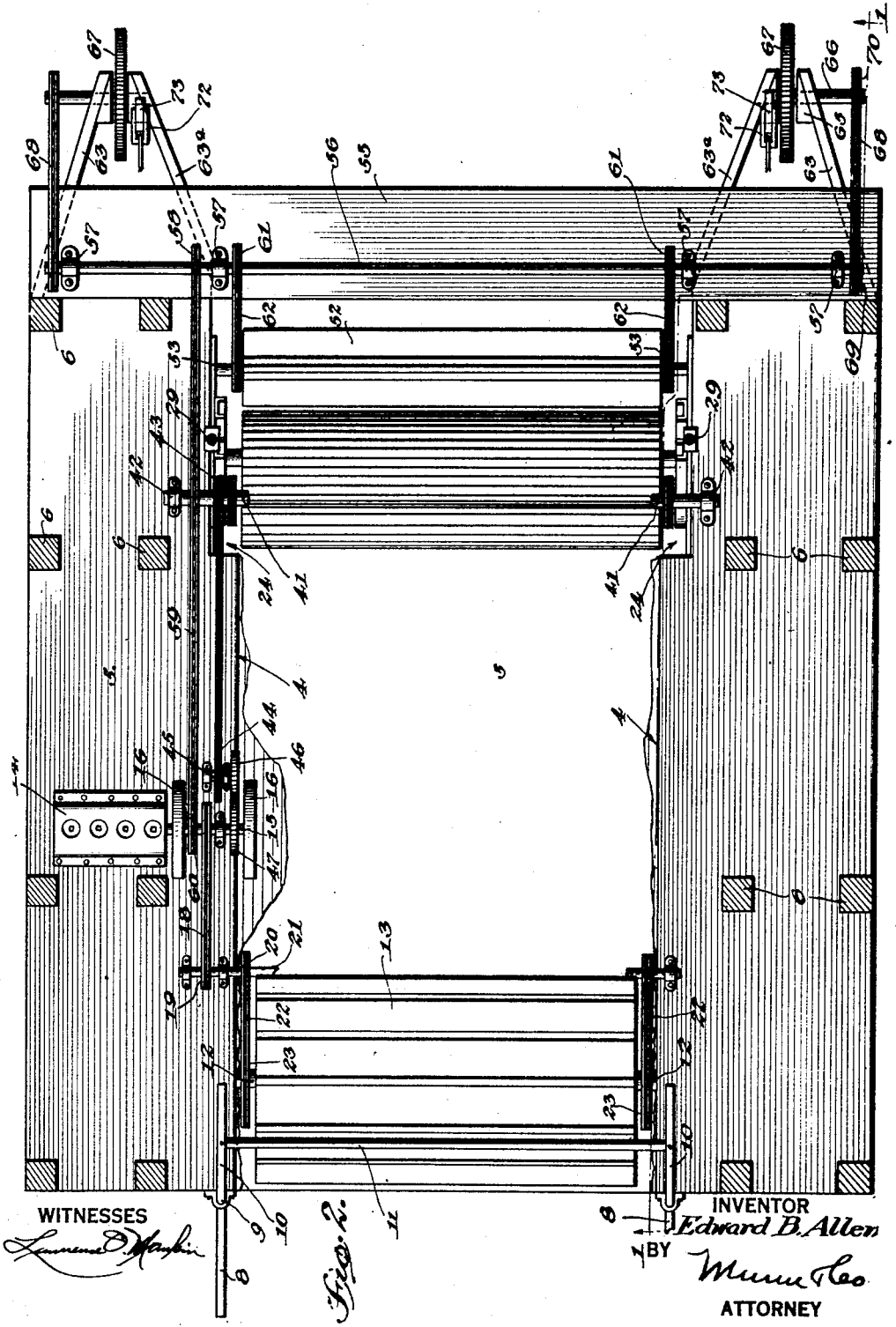

March 3, 1931.     E. B. ALLEN     1,795,003
MEANS FOR DESTROYING MARINE GROWTHS IMPEDING NAVIGATION
Filed Oct. 4, 1928     3 Sheets-Sheet 3
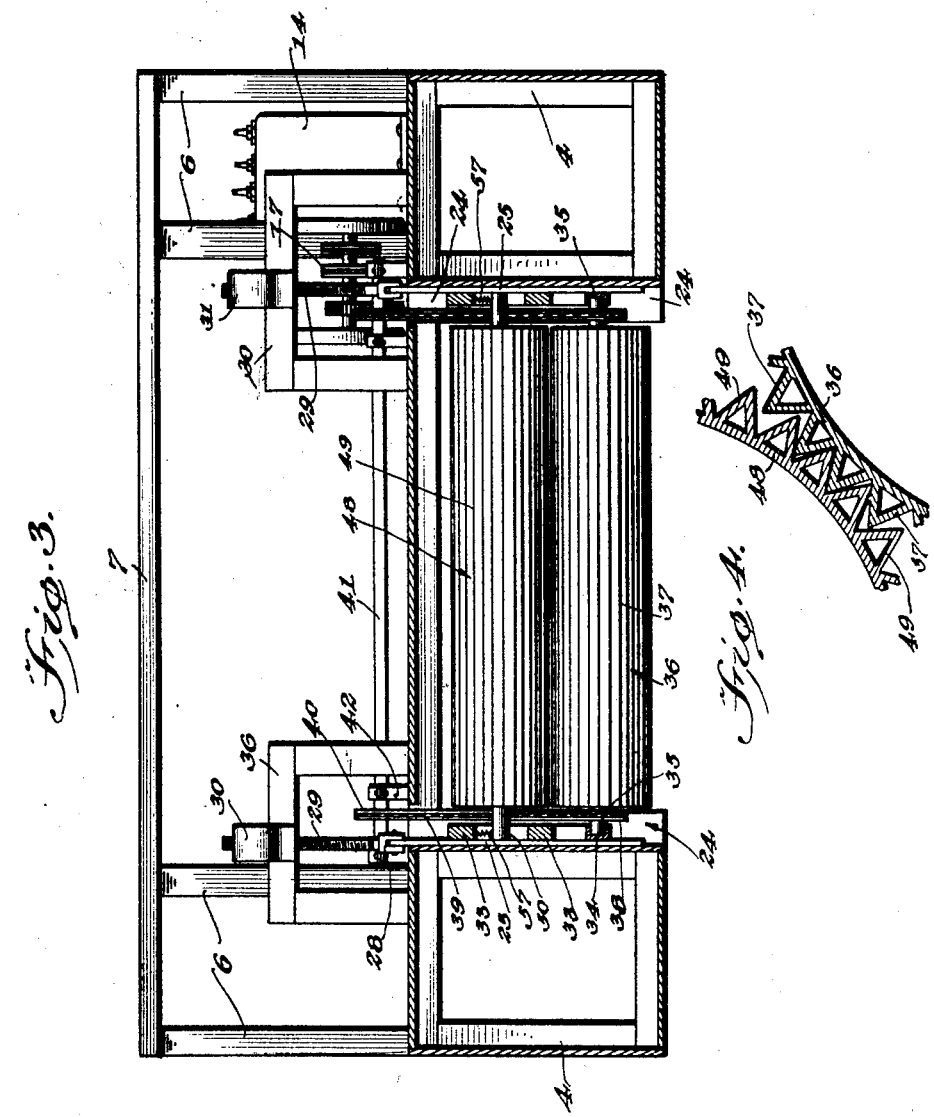
WITNESSES
INVENTOR
Edward B. Allen,
BY
ATTORNEY Patented Mar. 3, 1931

1,795,003

UNITED STATES PATENT OFFICE

EDWARD B. ALLEN, OF DUNNELLON, FLORIDA

MEANS FOR DESTROYING MARINE GROWTHS IMPEDING NAVIGATION

Application filed October 4, 1928. Serial No. 310,411.

This invention has for its object the destruction of floating marine growths such as the rapidly growing water hyacinth and similar floating aquatic growths, which obstruct the surface of navigable waters and impede, if not prevent, navigation.

It has been the practice heretofore to gather and remove the growth from the area to be navigated, the plants or weeds being redeposited at outlying points on the water surface. Usually, however, it works back with wind and tide to again cover the area to be navigated. The enormous amount and heavy weight of the growth has made the cost of transferring it to land prohibitive, and the lack of availability of land where its deposit is not objectionable further increasing the cost of and prohibiting this course of action.

If the water hyacinth or similar floating aquatic growth is cut up, finely comminuted and strewn upon the surface of the water, it will decay and sink to the bottom, and thereby be destroyed. My invention is predicated upon and functions to accomplish this result economically and by efficient mechanical aids.

Generally stated, the described method of destroying such floating aquatic growths is, in accordance with the present invention, used by a novel water vehicle embodying plant cutting means, comminuting, and dispersing means.

With the above noted and other objects in view, the invention consists in certain novel features of construction and combinations and arrangements of parts as are more fully described hereinafter and pointed out in the claims. The invention will be more fully understood from the following detailed specification which is to be read in conjunction with the accompanying drawings forming part thereof, and in which:

Figure 1 is a longitudinal vertical section through a water vehicle constructed for and equipped with the growth destroying means of the present invention, this section being taken approximately on the line 1—1 of Figure 2.

Figure 2 is a horizontal sectional view taken on the line 2—2 of Figure 1.

Figure 3 is a transverse vertical section taken on the line 3—3 of Figure 1.

Figure 4 is a fragmentary transverse section through the comminuting rolls.

The growth-destroying water vehicle of the present invention embodies a pair of substantially parallel spaced floating sections or pontoons 4, having a connecting flooring 5 spanning their top faces, and a suitable super-structure to protect the operating mechanism. As shown, a series of upright posts 6 support a roofing 7.

The course of movement of the vehicle is directed by rudders 8 having hinging bars 9 supported in bearings at the rear end of each of the pontoon sections, and provided with forwardly inturned end cranks 10 pivotally connected for movement in unison by a long link bar 11 traversing the pontoon sections at their rear ends.

The vehicle is propelled through an elongated bladed or paddle wheel 13 mounted on a shaft 12, whose ends are appropriately journaled in the inner sides of the pontoon sections. Power is supplied to rotate the paddle wheel, as well as other mechanism which will be later described, through a suitable motor, such as the internal combustion engine 14 mounted on top of one of the pontoons 4, and having its drive shaft 15 supported in suitable bearings and mounting duplex fly wheels 16 in spaced relation. Intermediate of the fly wheels, the shaft mounts a sprocket gear 17 (Figures 1 and 3), which rotates through a sprocket chain connection 18 and a sprocket gear 19, a long shaft 20 mounting gears 19 and supported at its ends in suitable bearings on the pontoon sections, as shown in Figure 4. This shaft traverses the space between the pontoon sections and carries sprocket gears 21 from which power is transmitted by chains 22 to alined sprocket gears 23 on the ends of the paddle wheel 12 inwardly of and adjacent to the pontoon sections. The blades of the paddle wheel, when power driven through these connections, not only serve to propel the vehicle through the water, but, as will be seen later, function also to disperse to the rear of the vehicle the floating water plant or weed growth cut and comminuted by mechanism which will now be described.

The inner sides of the pontoon sections adjacent to their forward ends are recessed outwardly, as at 24, Figures 1-3, to seat bearing plates 25, which, as shown, are of triangular shape and have pairs of parallel vertical slots 26 therein through which extend the shanks of guiding studs 27 outstanding from the inner recessed side faces of the pontoon sections, and guiding the plates for vertical bodily movement. These plates are located at the forward end of the pontoon sections, their pointed upper ends extending through slots in the flooring 5 and being coupled to clevises 28, in which are swivelled the lower ends of jacking screw shanks 29, whose upper ends extend through threaded bores in cross bars 30 of suitable jack frames, such as shown in Figure 3, and through a surmounting yoke arm 31. The jacking screws are suitably rotated to raise and lower in said arms and yoke to in turn move the bearing plates 25 vertically, as by an intermittent grip ratchet mechanism 32 of conventional design.

Mounted and fixed upon the inner faces of the bearing plates 25 are elongated bearing blocks 33, which incline downwardly and rearwardly. At the lower ends, they are provided with sockets 34 to receive and journal the ends of a shaft 35, mounting a lower fixed comminuting roll or cylinder 36, which spans the space between the pontoon sections, and has its periphery formed with a circumferentially extending series of longitudinal growth cutting ribs or teeth of inverted V-shape in cross section, presenting longitudinal knife or cutting edges. The teeth are shown in detail in Figure 4. The shaft 35 at each of its ends, inwardly of the bearings 34, mounts sprocket gear 38 connected by sprocket chain 39 with an alined sprocket gear 40 mounted on a shaft 41 traversing the pontoons 4, and journalled at its ends in appropriate bearings 42 thereon. This shaft also carries at one end, adjacent a sprocket gear 40, a second sprocket gear 43, (Figure 2) looped over a correspondingly toothed sprocket gear 44 on a stub shaft 45 mounted in bearings on the pontoon 4 adjacent and parallel with the motor shaft 15. This stub shaft at its inner end carries a toothed gear 46 meshing with a second toothed gear 47 on the motor shaft 15. Motion is thereby transmitted from the motor shaft to shaft 41, and from shaft 41 to the lower fixed comminuting roll 36.

A second and cooperating comminuting roll 48, having similar longitudinal teeth 49 upon its peripheral surface, is loosely mounted at the ends of its shaft 50 in an elongated slot 51 extending diagonally downwardly and rearwardly in the bearing block 33, and yieldingly held by spring pressure intergeared with the toothed periphery of the lower fixed roll 36. Rotation of the lower gear through the power driven connections described is in a counter-clockwise direction, as viewed in Figure 1, and effects a reverse rotation of the proper comminuting roll 48 intergeared therewith.

Extending transversely of the pontoons, forwardly of the comminuting rolls 36—48, is a bladed feeding member 52, whose shaft 53 is journaled at its ends in bearings formed in the inner faces of the bearing plates 25, and its blades are positioned to feed the floating water growth between the comminuting rolls 36—48. The shaft 53 of the bladed feeding member, adjacent to each of its journaled ends, carries a sprocket gear 54.

The front ends of the pontoon sections 4 are bevelled downwardly and rearwardly as shown in Figure 1, and the flooring 5 is extended forwardly therebeyond to provide an overhang 55 traversing the pontoons and projecting outwardly therefrom. This overhang not only serves to prevent the cut water growth from pushing up over the front ends of the pontoons and escaping the comminuting rolls, but serves as a support for a long drive shaft 56 mounted in pairs of bearings 57 at the opposite ends of the overhang, and serving to transmit power to the bladed feed member 52, and to certain growth cutting means projecting outwardly from the front ends of the pontoon sections. The shaft 56, to this end, mounts a sprocket gear 58, and is rotated through a sprocket chain 59 extending to a sprocket gear 60 on the motor drive shaft 15, as best seen in Figure 2. Adjacent and inwardly of the bearings 57 the shaft 56 mounts, in alinement with the sprocket gears 54 of the bladed feeding member, a pair of sprocket gears 61 which transmit motion thereto through the connecting sprocket chains 62.

A pair of approximately triangular frames 63 underlie and extend beyond the overhang 55, and are hinged at their upper rear ends, as at 64 (Fig. 1), to the front of each pontoon section. At their forward converging ends, they are formed with bearings 65, in which are journaled shafts 66, mounting between the side members of the frame toothed cutting disks 67, power operated through sprocket chains 68, connecting sprocket gears 69 and 70 on the ends of shafts 56 and 66, respectively. These cutting disks 67 are spaced apart to include therebetween the space between the pontoon sections 4, and the confronting inner side plates 63$^a$ of their frames act as guide surfaces and converge inwardly of the cutting disks to the space between the pontoons, and guide to the bladed feeding member 52 and the adjacent comminuting rolls, the plant growth which is severed by the cutters 67 in advance of the pontoons.

The frames 63 with their cutting blades 67 may be lifted upon their hinges 64 to adjust the elevation of the cutting blades similarly to the adjustment of the comminuting rolls and their bladed feeder member. Conveniently a flexible cable 71 may connect at its lower end through a clevis 72 with a post 73, (Fig. 1) upstanding from the frame 63, the upper end of the cable winding over a suitable drum 74 having a pawl and ratchet thereon and an operating crank, as shown in Figure 1.

The toothed cutting disks 67, it will be noted, project outwardly from the front of the pontoon sections, and enclose therebetween an area greater than the area between these sections, so that a relatively large area of water surface and of floating plant or weed growths are encompassed therebetween. As the toothed disks rotate and cut this growth, the pontoon sections, forming what I have termed the water vehicle, are moved forwardly through their propelling water wheels, and the cut floating growth is guided rearwardly between the inclined guide surfaces formed by the sides 63ª of the cutter supporting frames. Obviously and as shown, the cutters, the feeder member 52 and the comminuting rolls are partially immersed in water, the lower comminuting roll being entirely immersed, or substantially so. The positions of these parts will be initially adjusted in correspondence to the load on the vehicle to position the cutting blades at the proper depth, and the bladed feeder and comminuting rolls at the proper elevation to permit the bladed feeder to catch and feed the cut growth inwardly between the rotating toothed comminuting rolls, which effectively break it up into smaller portions, which pass rearwardly from the rolls into the space between the pontoons, and are caught and dispersed rearwardly of the pontoons by the blades of the paddle wheel. These crushed and cut up portions of growth will be strewn upon the surface of the water, and will decay and subsequently sink to the bottom out of the way of navigation. This is particularly true of the floating aquatic plant known as the water hyacinth, which is of extremely rapid growth and a serious menace to navigation. While the described invention has been conceived primarily to deal with this type of aquatic plant, it, obviously, may be employed to deal with floating water growths generally.

While the described construction of water vehicle and its operating mechanisms represents a preferable structural embodiment, it is intended as illustrative rather than restrictive of the invention, and structural modification and re-arrangement to conform to varying conditions of manufacture and use are, therefore, contemplated in consonance with the spirit of the invention and the scope of the appended claims.

Having thus fully described the invention, what is claimed is:

1. A device of the character described comprising a floating water vehicle having spaced pontoon sections with a water area therebetween, growth cutting means mounted at the forward ends of said sections at opposite sides of said water area, and growth comminuting means mounted rearwardly of said cutting means and supported by and between said pontoon sections within the area therebetween.

2. A device of the character described comprising a dirigible floating power impelled water vehicle having spaced pontoons with a water area therebetween, a pair of growth cutting implements mounted at the opposite forward ends of said pontoons at opposite sides of said water area, and power driven growth comminuting means rearwardly of and between said cutting implements supported by said pontoons within the area therebetween.

3. A device of the character described comprising a floating water vehicle embodying spaced floating sections with a water area therebetween, growth cutting means mounted at the forward end of each section at opposite sides of said water area, and growth comminuting means rearwardly of and spanning said cutting means supported by said floating sections and positioned therebetween within said water area.

4. A device of the character described comprising a floating water vehicle embodying spaced pontoon sections with a water area therebetween, growth cutting means mounted on and extending outwardly and forwardly from the front end of each pontoon section at opposite sides of said water area, power driven growth comminuting means supported between said sections rearwardly of said cutting means and within said water area, and means for guiding the growth severed by said cutting means rearwardly therefrom to said comminuting means.

5. A device of the character described comprising a floating water vehicle embodying substantially parallel spaced floating sections with a water area therebetween, growth cutting means mounted on and extending outwardly from the forward end of each section at opposite sides of said water area, power driven growth comminuting rolls mounted between and spanning said sections at their front and positioned within said water area, and guiding surfaces extending from said cutting means to the inner sides of said sections to direct the cut growth to said comminuting rolls.

6. A device of the character described comprising a water vehicle embodying substantially parallel spaced floating sections with a water area therebetween, growth cutting implements mounted in spaced relation and extending upwardly from the forward end of each section at opposite sides of said water area and having supporting means presenting guiding surfaces directing growth cut thereby rearwardly to the space between said sections, and power driven intergeared tooth comminuting rolls mounted between and spanning said sections rearwardly of said cutting implements and guiding surfaces and positioned within said water area to receive therebetween the cut growth guided rearwardly thereto by said surfaces.

7. A device of the character described comprising a water vehicle embodying substantially parallel spaced pontoon sections having a water area therebetween, growth cutting implements mounted at the forward ends of each section at opposite sides of said water area, power driven intergeared toothed comminuting rolls mounted between and spanning said sections forwardly thereof and rearwardly of said cutting implements and positioned within said water area, guiding surfaces extending from said implements rearwardly toward said rolls to direct the cut growth rearwardly to said rolls, and a bladed power driven wheel mounted between and spanning said pontoon sections rearwardly thereof and acting on the water area between said sections for dispersing rearwardly from between said sections the comminuted growth passed from said rolls.

8. A device of the character described comprising a water vehicle embodying substantially parallel spaced pontoon sections with a water area therebetween, power driven growth cutting members mounted at and projecting outwardly from the forward end of each section and spaced to include therebetween the water area between the pontoons, power driven intergeared comminuting rolls mounted between and spanning the space between the pontoon sections forwardly thereof and rearwardly of said cutting members and positioned within said water area to receive therebetween the growth cut by said members and passing rearwardly therefrom, and a power driven paddle wheel for propelling the vehicle mounted between and spanning the pontoons rearwardly thereof to act upon the water area between said sections and functioning also to disperse to the rear of the pontoons the cut growth comminuted by said rolls and passing rearwardly therefrom to the water area in advance of said paddle wheel.

9. A device of the character described comprising a water vehicle embodying substantially parallel spaced pontoon sections with a water area therebetween, power driven growth cutters extending outwardly from the forward end of each pontoon section and spaced to include therebetween the water area between the pontoons, said cutters having supporting means presenting guiding surfaces directing the cut growth rearwardly to the water area between said sections, power driven intergeared comminuting rolls mounted and spanning the space between the pontoon sections forwardly thereof and rearwardly of said guiding surfaces and positioned within the water area between said sections to receive therebetween the cut growth, a power driven bladed feeder positioned forwardly of said rolls to direct the cut growth therebetween, means for vertically adjusting said rolls and feeder on the pontoon sections, and a power driven paddle wheel mounted between and spanning said sections rearwardly thereof and acting on the water area between said sections to propel the vehicle and to disperse to the rear of said vehicle the cut growth comminuted by and discharged from said rolls.

EDWARD B. ALLEN.